(12) United States Patent
Gooden et al.

(10) Patent No.: US 9,540,131 B2
(45) Date of Patent: Jan. 10, 2017

(54) APPARATUS AND METHOD FOR FORMING A CONTAINER HAVING A RECEPTACLE AND AN INTEGRAL CAP AND PRODUCT FORMED THEREBY

(71) Applicant: Capitol Vial Inc., Auburn, AL (US)

(72) Inventors: Michael Gooden, Opelika, AL (US); Randall Lecroy, Opelika, AL (US)

(73) Assignee: Capitol Vial Inc., Auburn, AL (US)

( * ) Notice: Subject to any disclaimer, the term of this patent is extended or adjusted under 35 U.S.C. 154(b) by 0 days.

(21) Appl. No.: 13/915,800

(22) Filed: Jun. 12, 2013

(65) Prior Publication Data

US 2013/0264304 A1    Oct. 10, 2013

Related U.S. Application Data

(62) Division of application No. 11/463,717, filed on Aug. 10, 2006, now Pat. No. 8,491,832.

(51) Int. Cl.
*B29C 49/04* (2006.01)
*B65D 51/00* (2006.01)
(Continued)

(52) U.S. Cl.
CPC ........... *B65D 1/0246* (2013.01); *B29C 45/006* (2013.01); *B29C 49/06* (2013.01); *B29C 49/064* (2013.01); *B65D 1/0223* (2013.01); *B65D 51/00* (2013.01); *B65D 55/16* (2013.01); *B29B 2911/1402* (2013.01); *B29B 2911/1404* (2013.01); *B29B 2911/14026* (2013.01); *B29B 2911/14033* (2013.01); *B29B 2911/14106* (2013.01); *B29B 2911/14133* (2013.01); *B29C 49/54* (2013.01); *B29C 49/56* (2013.01);
(Continued)

(58) Field of Classification Search
CPC .. B29C 45/0055; B29C 45/0081; B29C 49/06; B29C 49/061; B29C 49/32
USPC .................. 425/533, 534; 264/513, 515, 537
See application file for complete search history.

(56) References Cited

U.S. PATENT DOCUMENTS 243,547 A    6/1881   Goldsmith
3,086,249 A  4/1963   Nelson et al.
(Continued)

OTHER PUBLICATIONS

United States International Searching Authority, International Search Report and Written Opinion of the International Searching Authority, International Application No. US07/75149, mailed Oct. 2, 2008 (10 pages).
(Continued)

*Primary Examiner* — Alison L Hindenlang
*Assistant Examiner* — Mohamed K Ahmed Ali
(74) *Attorney, Agent, or Firm* — Wood Herron & Evans LLP (57) ABSTRACT

An apparatus for forming a container generally comprises a first mold part having an injection mold portion and a blow mold portion and a second mold part having a core pin. The core pin is configured to cooperate with the injection mold portion in a first position to define an injection mold cavity for forming a preform and an integral cap. The core pin is also configured to cooperate with the blow mold portion in a second position to define a blow mold cavity for forming a receptacle from the preform. The cap may be closed at the blow mold portion to seal the receptacle. One or more threads may be formed on a neck of the container.

8 Claims, 13 Drawing Sheets

(51) Int. Cl.

| | | |
|---|---|---|
| *B65D 1/02* | (2006.01) | |
| *B29C 45/00* | (2006.01) | |
| *B29C 49/06* | (2006.01) | |
| *B65D 55/16* | (2006.01) | |
| *B29C 49/54* | (2006.01) | |
| *B29C 49/56* | (2006.01) | |
| *B29C 49/02* | (2006.01) | |
| *B29K 105/00* | (2006.01) | |
| *B29L 31/56* | (2006.01) | |
| *B29L 31/00* | (2006.01) | |

(52) U.S. Cl.
CPC .. *B29C 2049/023* (2013.01); *B29K 2105/253* (2013.01); *B29L 2031/565* (2013.01); *B29L 2031/7158* (2013.01)

(56) References Cited

U.S. PATENT DOCUMENTS

| | | | |
|---|---|---|---|
| 3,419,179 A | 12/1968 | Deuschle et al. | |
| 3,534,435 A | 10/1970 | John | |
| 3,911,920 A | 10/1975 | Susinn | |
| 4,230,298 A | 10/1980 | Valyi | |
| 4,323,067 A | 4/1982 | Adams | |
| 4,375,947 A | 3/1983 | Marcus | |
| 4,379,688 A | 4/1983 | Tate et al. | |
| 4,390,111 A | 6/1983 | Robbins et al. | |
| 4,540,543 A | 9/1985 | Thomas et al. | |
| 4,548,332 A | 10/1985 | Neat | |
| 4,655,363 A | 4/1987 | Neat | |
| 4,783,056 A | 11/1988 | Abrams | |
| 4,812,116 A | 3/1989 | Abrams | |
| 4,950,152 A * | 8/1990 | Brun et al. | 425/533 |
| 4,974,757 A | 12/1990 | Brotz | |
| 5,008,066 A * | 4/1991 | Mueller | 264/537 |
| 5,038,454 A | 8/1991 | Thornock et al. | |
| 5,051,227 A | 9/1991 | Brun, Jr. et al. | |
| 5,133,470 A | 7/1992 | Abrams et al. | |
| 5,601,214 A | 2/1997 | Hendrickson et al. | |
| 5,662,245 A * | 9/1997 | Grant | 222/153.07 |
| 5,667,094 A | 9/1997 | Rapchak et al. | |
| 5,723,085 A | 3/1998 | Abrams et al. | |
| 5,744,082 A | 4/1998 | Bak | |
| 5,885,517 A | 3/1999 | Hendrickson et al. | |
| 6,131,755 A | 10/2000 | Soyka, Jr. et al. | |
| 6,253,937 B1 | 7/2001 | Anderson | |
| 6,264,072 B1 | 7/2001 | Johannes | |
| 6,302,286 B1 | 10/2001 | Witherspoon | |
| RE37,676 E | 4/2002 | Abrams et al. | |
| 6,398,067 B1 | 6/2002 | Belfance et al. | |
| 6,413,468 B1 | 7/2002 | Britton | |
| 6,516,963 B2 | 2/2003 | Mihashi | |
| 6,530,493 B2 | 3/2003 | Anderson | |
| 6,622,882 B2 | 9/2003 | Smith | |
| 6,669,049 B2 | 12/2003 | Crider | |
| 6,705,463 B1 | 3/2004 | Bucholtz et al. | |
| 6,732,773 B2 | 5/2004 | Renz | |
| 6,736,628 B1 | 5/2004 | Zuffa | |
| 6,769,558 B1 | 8/2004 | Bucholtz | |
| 6,833,102 B2 | 12/2004 | Martino et al. | |
| 6,910,594 B2 | 6/2005 | Foley et al. | |
| 7,001,564 B1 | 2/2006 | Geisinger | |
| 7,472,797 B2 | 1/2009 | Ostrowski | |
| 2005/0023238 A1 | 2/2005 | Wong | |
| 2006/0025718 A1 | 2/2006 | Ostrowski | |
| 2006/0049550 A1 | 3/2006 | Lin | |
| 2009/0134112 A1 | 5/2009 | Reeves | |
| 2015/0368013 A1 | 12/2015 | Obregon | |

OTHER PUBLICATIONS

Canadian Intellectual Property Office, Third Office Action, Canadian Application No. 2,660,644, dated May 27, 2015 (3 pages).

* cited by examiner

APPARATUS AND METHOD FOR FORMING A CONTAINER HAVING A RECEPTACLE AND AN INTEGRAL CAP AND PRODUCT FORMED THEREBY

CROSS REFERENCE TO RELATED APPLICATION

This application is a divisional of co-pending U.S. patent application Ser. No. 11/463,717, filed Aug. 10, 2006, the disclosure of which is hereby incorporated herein by reference in its entirety.

FIELD OF THE INVENTION

The present invention relates generally to containers, and more particularly, to an apparatus and method for forming a container having a receptacle and an integral cap.

BACKGROUND OF THE INVENTION

Containers have long been used in a wide variety of industries to collect, store, and dispense various substances. Most traditional containers have an opening into an internal cavity and are provided with a cap for sealing the cavity. The seal is often achieved by the interaction of threads, a snap-fit, or by using a separate strap to attach the cap. Because caps are typically produced separately from containers and are especially susceptible to being lost or misplaced, some manufactures have found it desirable to produce containers having integrally-formed caps.

This is especially true in fields where the cap is used to seal the container so that the internal cavity remains sterile prior to use. For example, U.S. Pat. No. 4,783,056 to Abrams, the disclosure of which is incorporated herein by reference in its entirety, discloses a process for forming a vial having an integral cap. The process generally comprises positioning a first mold part relative to a second mold part to define a cavity having the shape of the vial, the cap and a connecting strap or flange extending between the vial and cap. After injecting molten thermoplastic material into the cavity and letting it cool, the first mold part is moved away from the second mold part. A pivot member, such as a "flipper arm", may then be pivoted to seal the cap onto the vial prior to releasing the final product from the mold. Thus, by closing the cap while the vial is still within the mold, the heat of the molding process is used to maintain sterility. Additional steps to seal the cap in an aseptic environment are not required, which reduces overall manufacturing costs and production times.

One of the drawbacks associated with this process, however, relates to its inability to produce containers of various shapes and sizes. Because the injection molding process requires separate mold pieces that must be moved apart from each other to release the final product, the shape of the resulting containers is oftentimes limited to that of a vial. In other words, the containers are often generally cylindrical in cross-section with little or no variation in diameter along their length.

Although some attempts have been made to blow mold a preform or parison after it has been injection molded to ultimately form a bottle or similar container having an integral cap and a receptacle with varying width, there are currently several drawbacks that limit the effectiveness of such attempts. For example, U.S. Pat. No. 5,008,066 to Mueller, discloses a method of forming a container having an integral cap involving both an injection molding step and a blow molding step. The injection molding step produces an open-ended, generally cylindrical preform, which is subsequently blow molded to expand the preform into a cavity that defines the final shape of the container. In the process of Mueller, two separate injection and blow molding stations are required. The molded preform is ejected from the injection molding station and then it must be transferred to the blow molding apparatus station where it is blow molded into the final container shape. The result is an increase in required machinery, production times, and overall costs.

Therefore, there is a need for an improved apparatus and method for forming a container having a receptacle and integral cap.

SUMMARY OF THE INVENTION

The present invention overcomes the foregoing and other shortcomings and drawbacks of containers heretofore known having an integral cap. While the invention will be described in connection with certain embodiments, it will be understood that the invention is not limited to these embodiments. On the contrary, the invention includes all alternatives, modifications and equivalents as may be included within the spirit and scope of the present invention.

The present invention provides an apparatus that incorporates both an injection mold portion and a blow mold portion within a single mold part to form a container having a receptacle and an integral cap. Such an arrangement enables an injection molded, vial-shaped preform or parison having a cap integrally attached thereto to be subsequently blow molded to form the desired shape of the receptacle.

To this end, and in accordance with one embodiment of the present invention, the apparatus generally comprises a first mold part having the injection mold portion and the blow mold portion and a second mold part having a core pin. The core pin is configured to cooperate with the injection mold portion in a first position to define an injection mold cavity for forming the preform and integral cap. The core pin is also configured to cooperate with the blow mold portion in a second position to define a blow mold cavity for forming the receptacle from the preform.

In one embodiment, the apparatus further includes a pivot member or flipper arm coupled to the blow mold portion of the first mold part. The pivot member is configured to rotate the cap over the receptacle at the appropriate time during the manufacturing process to close the receptacle. In one embodiment, the cap is configured to seal the receptacle without requiring any additional manipulation or handling. Thus, in addition to forming a container with an integral cap, the apparatus is capable of producing sealed containers of desired shapes and sizes that are "sterile-by-process."

In one embodiment, molten material is injected into the injection mold cavity to mold the preform and integral cap. One or more threads may be formed on a neck of the preform. Once the molten material has sufficiently cooled, the second mold part is retracted from the first mold part and the preform and cap are transferred from the injection mold portion to the blow mold portion. The core pin retains the preform as the second mold part is repositioned relative to the first mold part so that the core pin is aligned with the blow mold portion. The second mold part is then positioned against the first mold part so that the preform is received in the blow mold cavity of the blow mold portion.

The blow mold cavity has a different configuration than the preform. When pressurized gas is blown through an exterior surface of the core pin, the preform expands to conform to the shape of the blow mold cavity and form the receptacle. Thus, the blow mold cavity defines the desired shape of the receptacle to be formed. The receptacle remains in the blow mold cavity when the second mold part is retracted from the first mold part. Because the core pin is pulled out of the blow mold cavity, retracting the second mold part exposes an opening into an internal cavity of the receptacle. The pivot member may then be actuated to rotate the cap over the opening and thereby close the container. When the closed container is released or ejected from the blow mold portion, the second mold part can return to the first position to begin producing another container.

By virtue of the foregoing, there is thus provided an improved apparatus and method of forming a container having a receptacle and an integral cap. Because the containers are produced using both an injection molding step and a blow-molding step, the shape of their receptacles is not limited to that of a vial. Additionally, the apparatus and method do not require additional machinery to complete the manufacturing processes or to seal the containers with a cap.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE PREFERRED EMBODIMENT

Figure 10A:
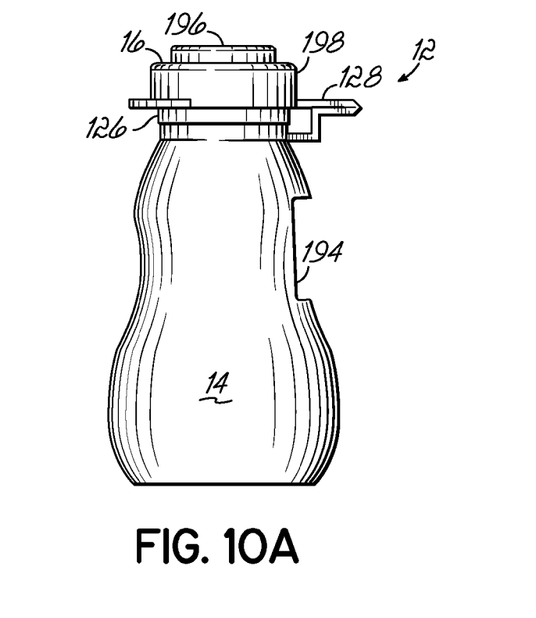
FIG. 10A is a side elevational view of an exemplary closed container formed by the injection blow mold system of the present invention.
Figure 10B:
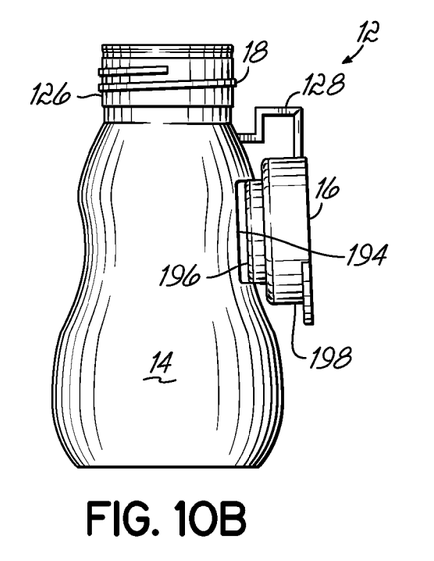
FIG. 10B is a view similar to FIG. 10A, showing the container opened with the integral cap retained in the open position by a side wall of the container.

Referring now to the figures, an injection blow mold system 10 is shown in accordance with one embodiment of the present invention for forming a container 12 having a receptacle 14 and an integral cap 16 attached thereto. In one embodiment, as shown in FIGS. 10A and 10B, the container 12 may include one or more threads 18 to provide a screw-on connection between the container 12 and a breast pump, for example, as will be described in greater detail below.

In accordance with the principles of the present invention, the injection blow mold system 10 generally comprises a stationary mold part 20 and a movable mold part 22 that are adapted to cooperate with each other to define both an injection mold cavity 24 and one or more blow mold cavities 26. As will be described in greater detail below, thermoplastic material is supplied to the injection mold cavity 24 to produce a hollow preform having an integral cap attached thereto that is subsequently blow molded within one of the blow mold cavities 26 to form the desired container shape with the container closed by the integral cap.

Figure 4:
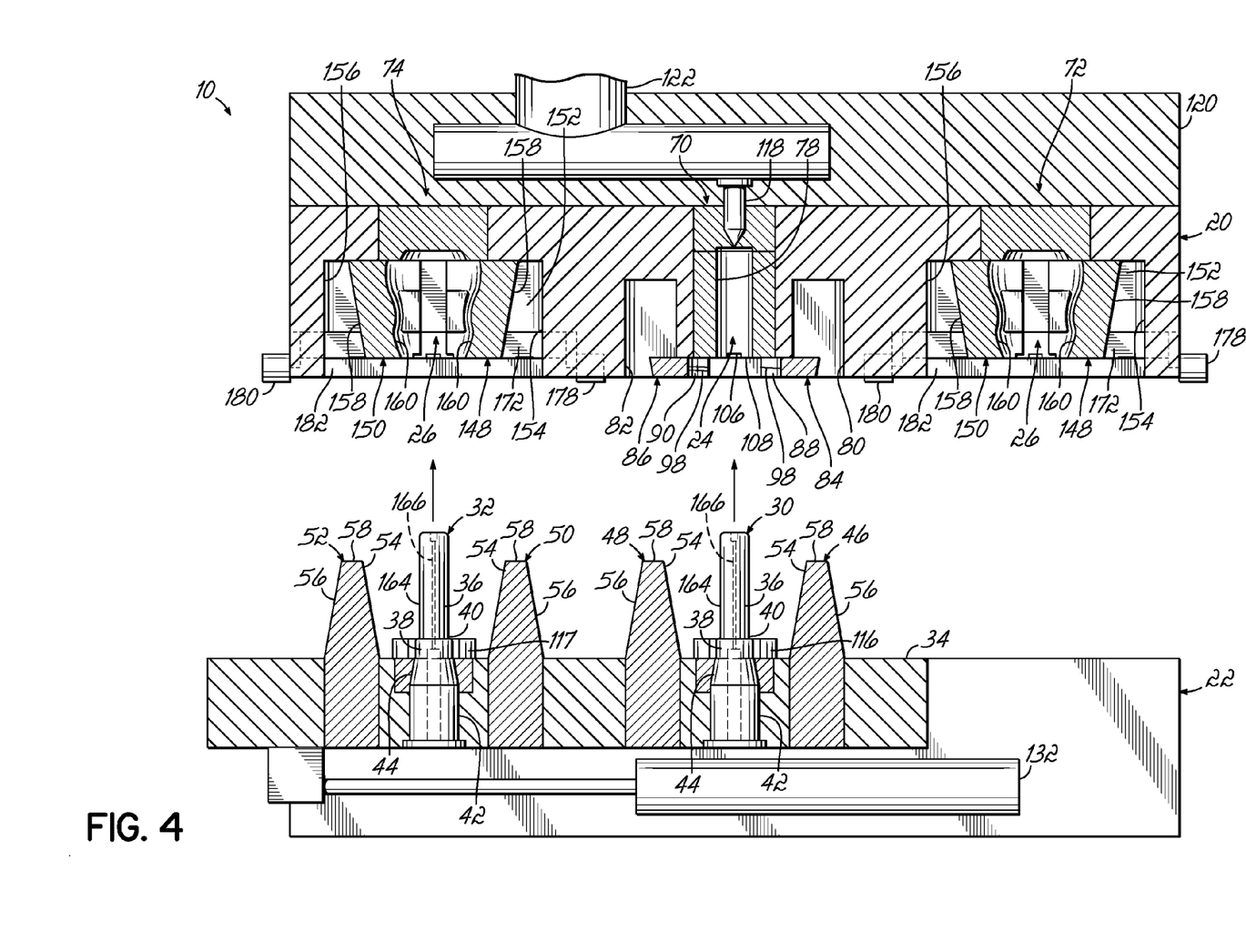
FIG. 4 is a cross-sectional view taken along line 4-4 of FIG. 1, showing the injection blow mold system in the open position.

With reference to FIG. 4, the components of the stationary and movable mold parts 20, 22 are shown in further detail. The movable mold part 22 includes first and second elongated core pins 30, 32 protruding from an exterior surface 34 configured to face the stationary mold part 20. Each core pin 30, 32 may be generally cylindrical in cross section but may include sections of different diameter. More specifically, each core pin 30, 32 includes an elongate body section 36, a flange section 38 at one end 40 of the body section 36, a base section 42 having a diameter larger than the diameter of the flange section 38, and a tapered section 44 extending between the flange section 38 and the base section 42. The core pins 30, 32 are each centrally positioned between respective wedge members 46, 48 and wedge members 50, 52 that extend from the exterior surface 34 as well. Each wedge member may be generally prism-shaped with opposed sides 54, 56 that taper towards a top surface 58.

The stationary mold part 20 includes both an injection mold station 70 and one or more blow mold stations 72, 74 that cooperate with the core pins 30, 32 and associated wedge members 46, 48, 50, 52 as will be described in greater detail below to form the container 12. In one embodiment, the blow mold stations 72, 74 are provided on opposite sides of the injection mold station 70 with the blow mold stations 72, 74 spaced apart from the injection mold station 70 by a distance corresponding to the spacing between the pair of core pins 30, 32. Such an arrangement allows the movable mold part 22 to cooperate with the stationary mold part 20 to complete the required operations for forming the bottle 12 as described in detail below.

Figure 1:
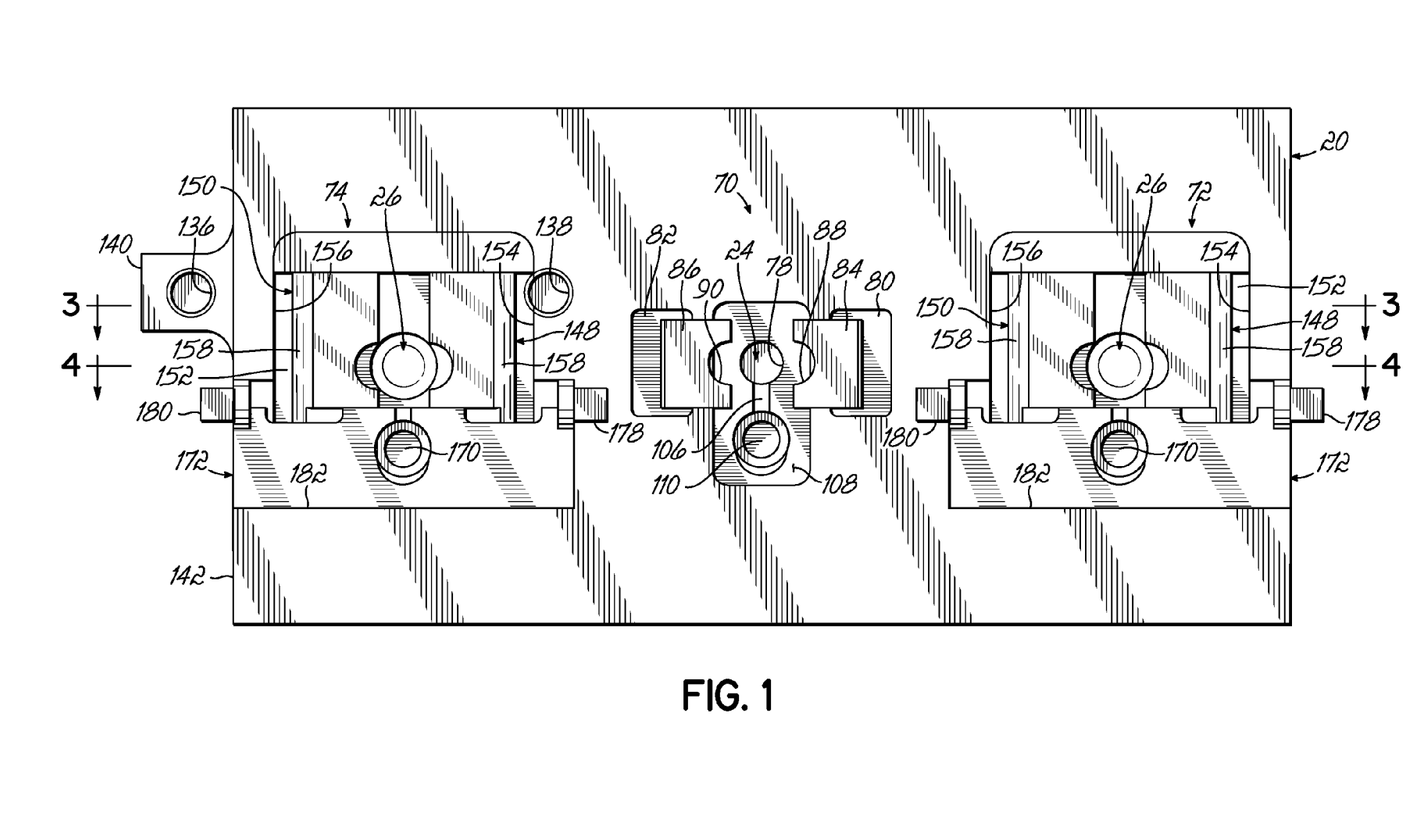
FIG. 1 is a front elevational view showing a stationary mold part of an injection blow mold system according to one embodiment of the present invention.

In one embodiment, the injection mold station 70 includes a central cavity 78 configured to receive the core pin 30, a side cavity 80 configured to receive the wedge member 46, and a side cavity 82 configured to receive the wedge member 48. Clamping the movable mold part 22 against the stationary mold part 20 results in the elongate body section 36 of the core pin 30 being freely received in the central cavity 78. The wedge members 46, 48 engage a pair of threaded cam members 84, 86 before being fully received within the side cavities 80, 82. As shown in FIGS. 1 and 4, the threaded cam members 84, 86 are movably connected to the stationary mold part 20 and include respective semi-circular surfaces 88, 90. The semi-circular surfaces 88, 90 are spaced apart from each other, and the threaded cam members 84, 86 are configured to slide relative to the stationary mold part 20 to open and close together. More specifically, as the wedge members 46, 48 are received in the side cavities 80, 82, the tapered sides 54 of the wedge members 46, 48 contact the threaded cam members 84, 86 to move them from their initial open positions shown in FIGS. 1 and 4 to the closed positions shown in FIG. 5.

Figure 5:
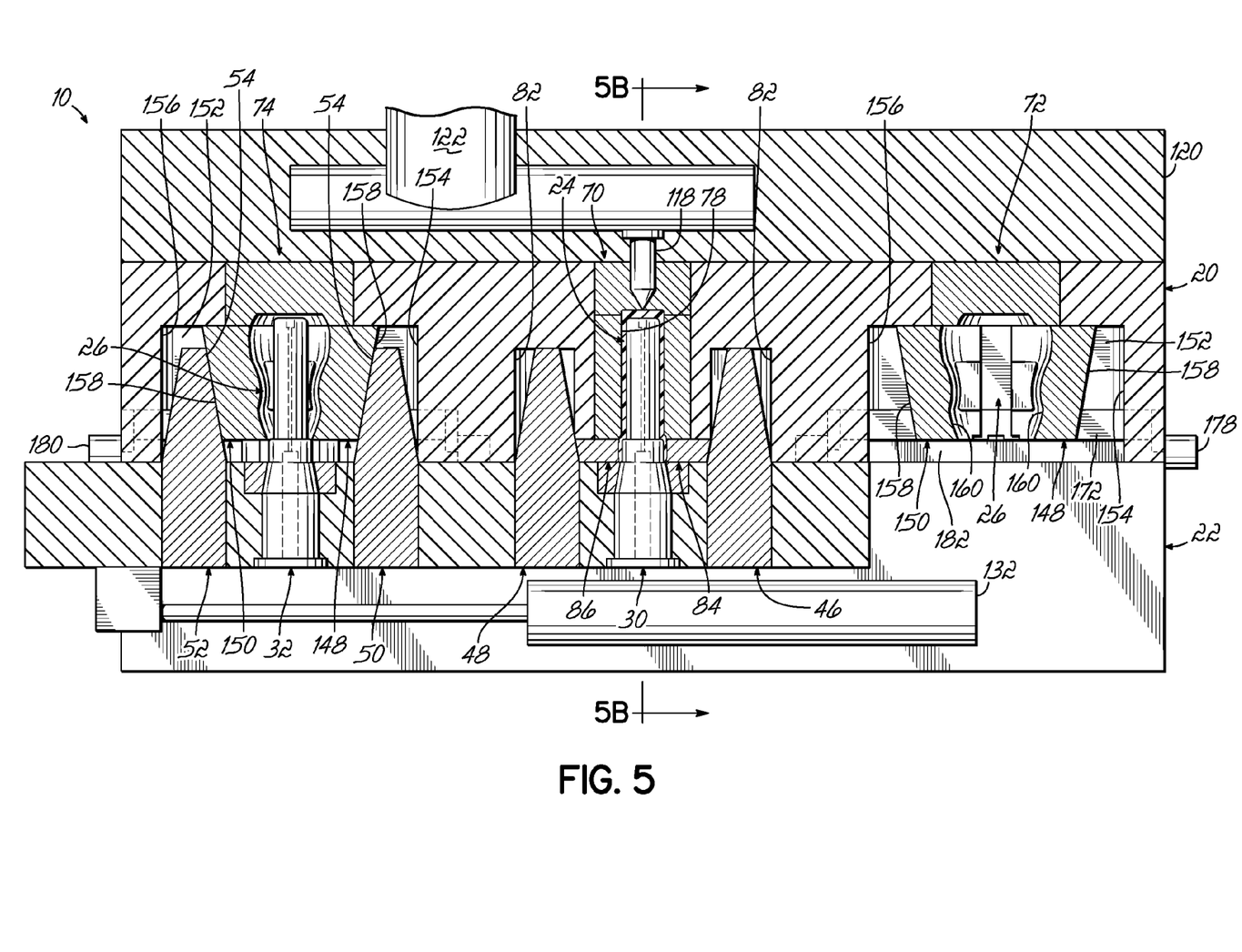
FIG. 5 is a view similar to FIG. 4, showing the injection blow mold system in a closed position and defining an injection mold cavity for forming a preform having an integral cap attached thereto.
Figure 5A:
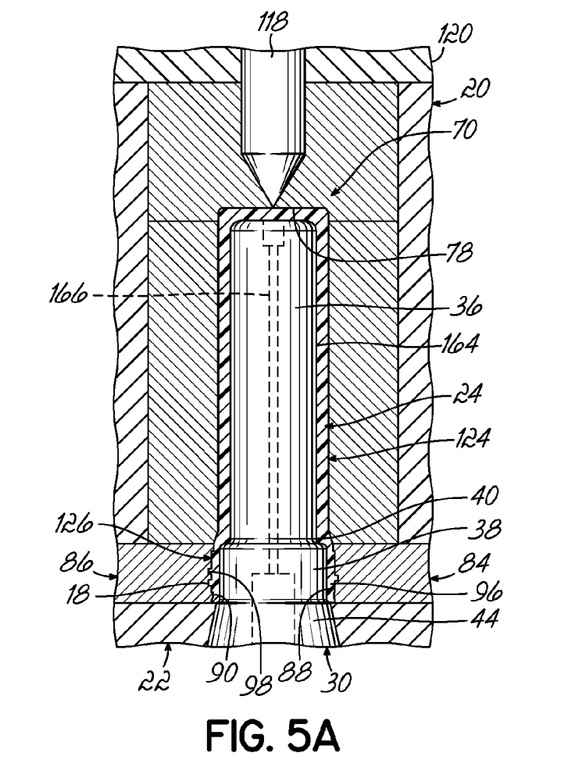
FIG. 5A is an enlarged view of the injection mold cavity shown in FIG. 5.
Figure 5B:
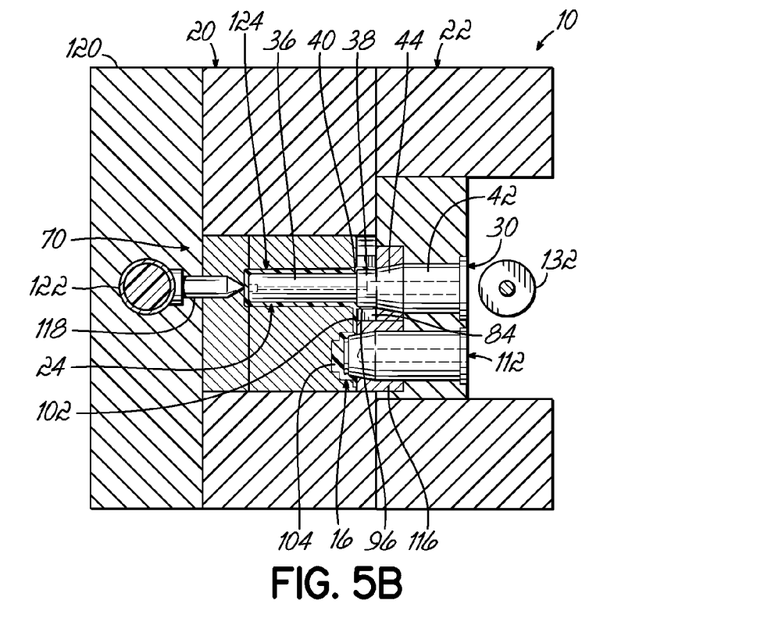
FIG. 5B is a cross-sectional view taken along line 5B-5B of FIG. 5.
Figure 5C:
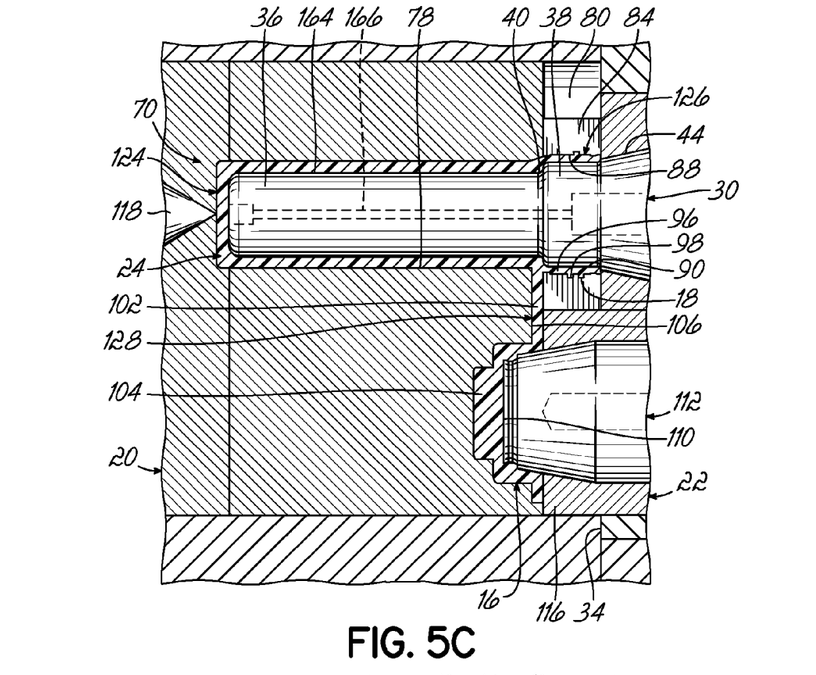
FIG. 5C is an enlarged view of the injection-mold cavity shown in FIG. 5B.

FIGS. 5A-5C illustrate the injection mold station 70 in greater detail after the movable mold part 22 has been clamped against the stationary mold part 20. As shown in the figures, the core pin 30 is slightly smaller than the central cavity 78 and thus cooperates with the injection mold station 70 to define the injection mold cavity 24 between the core pin 30 and a wall of the central cavity 78. A neck forming portion 96 of the injection mold cavity 24 is defined by the semi-circular surfaces 88, 90 of the threaded cam members 84, 86, which are positioned proximate the flange section 38 of the core pin 30. In one embodiment, the semi-circular surfaces 88, 90 of the threaded cam members 84, 86 each include female threads 98 so that corresponding male threads 18 (FIG. 10B) are defined in the neck forming portion 96 of the injection mold cavity 24.

The injection mold cavity 24 further includes a spacer portion 102 and a cap portion 104 adjacent the core pin 30. As shown in FIGS. 1 and 5B, the spacer portion 102 is defined by a recessed channel 106 provided in a surface 108 of the stationary mold part 20. The channel 106 extends between the central cavity 78 and an adjacent cavity 110, which has a shape that generally corresponds to the exterior of the cap 16 to be formed. To define the interior of the cap 16, the movable mold part 22 further includes core members 112, 114 (FIG. 2) positioned adjacent to the respective core pins 30, 32. The core members 112, 114 protrude from the surface 34 of the movable mold part 22 and are configured to cooperate with the cavity 110 to define the cap portion of the injection mold cavity 24. Thus, when the core pin 30 is received in the central cavity 78, the core member 112 is received in the adjacent cavity 110. Because the mold surface 108 does not contact the exterior surface 34 when the stationary and movable mold parts 20, 22 are clamped together, collar members 116, 117 are positioned around the respective core members 112, 114. The collar members 116, 117 help close the injection mold cavity 24, as best shown in FIG. 5C.

Referring again to FIGS. 5 and 5A-5C, the stationary mold part 20 further includes an injection passage 118 configured to supply thermoplastic material to the injection mold cavity 24. A mold piece 120 may be coupled to the stationary mold half 20 to define additional fluid passages 122 and to direct the thermoplastic material from a supply (not shown) to the injection mold passage 118. The thermoplastic material preferably has properties suitable for injection molding and blow molding. When the material is injected into the injection mold cavity 24, it flows into the neck forming portion 96, spacer portion 102, cap portion 104, and the remainder of the injection mold cavity 24. In one embodiment, the injected thermoplastic material forms an elongated preform 124 on the body section 36 of the core pin 30, a threaded neck 126 extending from the preform 124, the integral cap 16, and a hinged strap 128 interconnecting the cap 16 and the preform 124.

Figure 2:
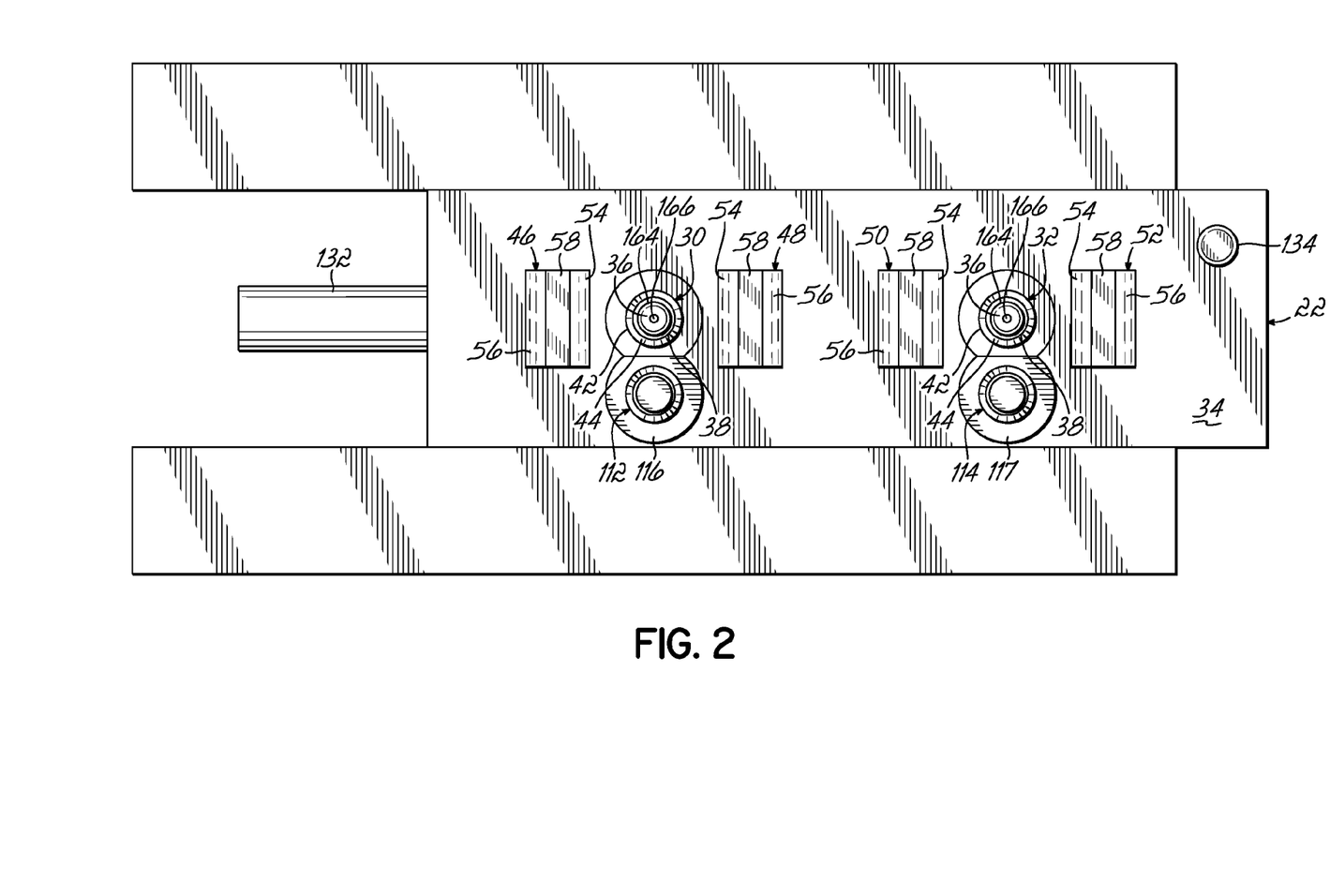
FIG. 2 is a view similar to FIG. 1 showing a movable mold part of the injection blow mold system shown in FIG. 1.
Figure 3:
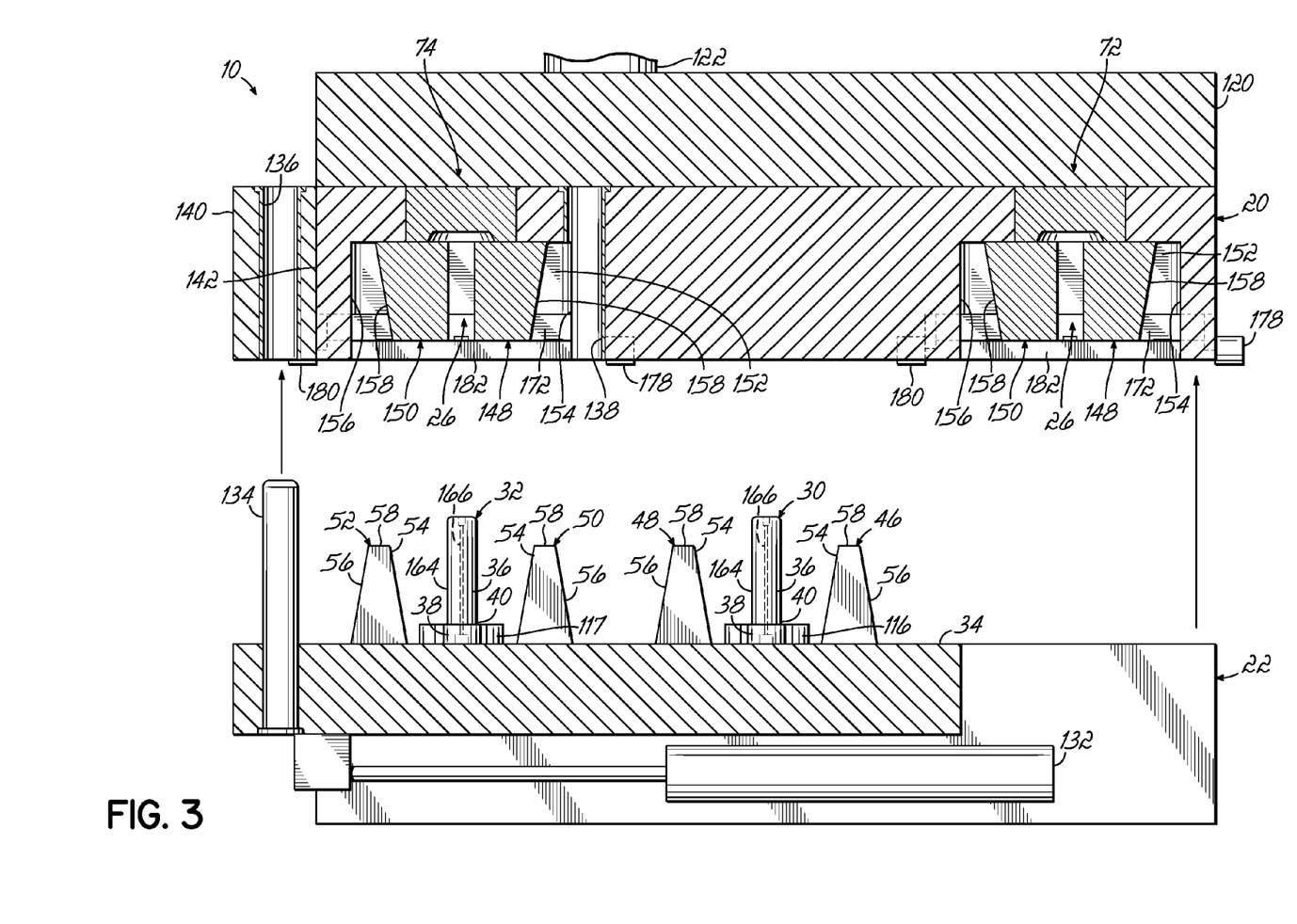
FIG. 3 is a cross-sectional view, taken along line 3-3 of FIG. 1 showing the injection blow mold system in an open position with the stationary mold part of FIG. 1 spaced from the movable mold part of FIG. 2.
Figure 6:
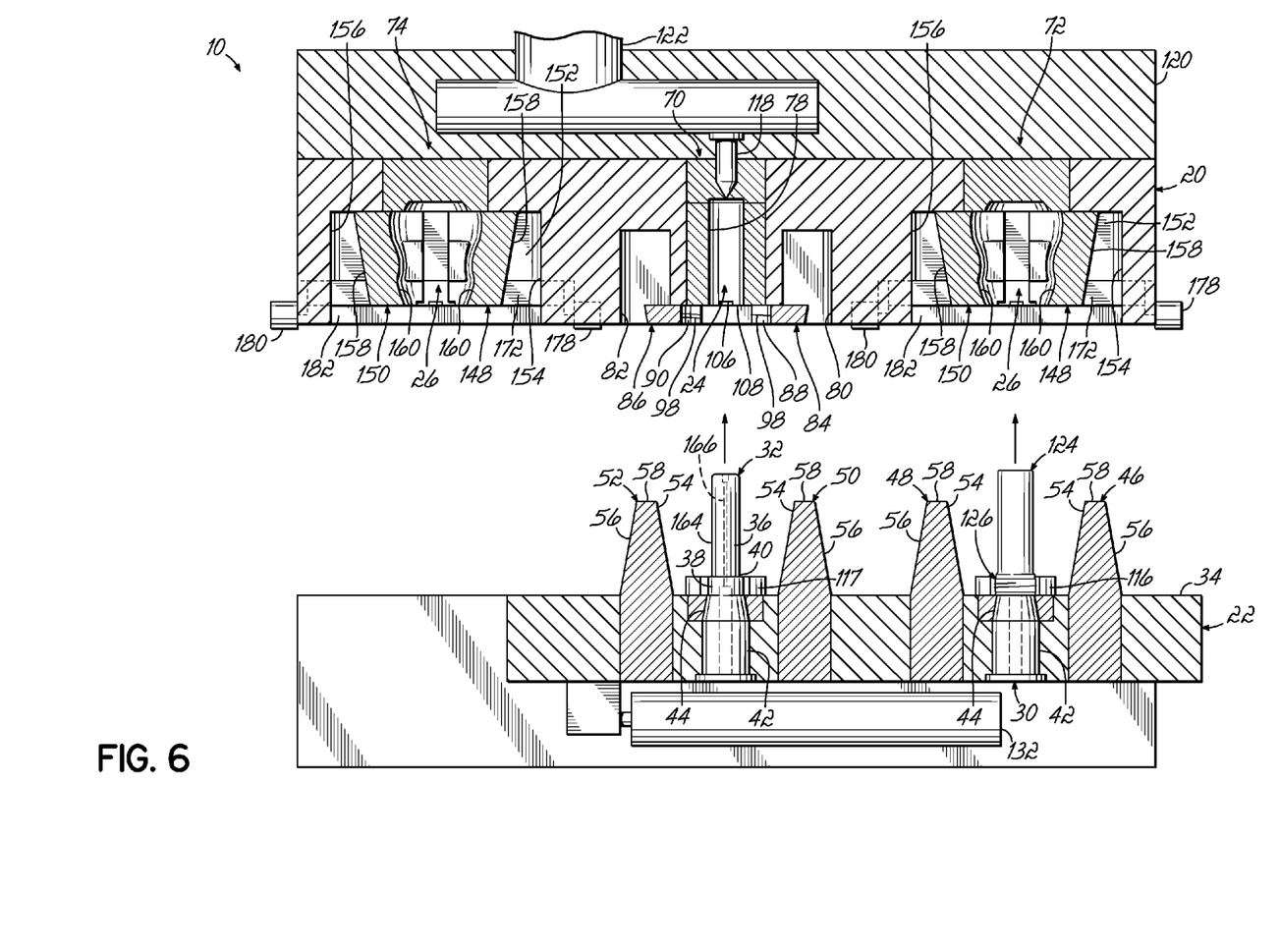
FIG. 6 is a view similar to FIG. 4, showing the injection blow mold system in an open position with the movable mold part shifted to the right side of the figure relative to the stationary mold part.

With reference to FIGS. 5 and 6, the movable mold part 22 is retracted from the stationary mold part 20 after the injection molding step is completed. The preform 124 and cap 16 remain positioned on the core pin 30 and the core member 112, while the threaded cam members 84, 86 move back toward their initial open positions. The movable mold part 22 is then shifted or repositioned relative to the stationary mold part 20 so that the core pin 30 is substantially aligned with the blow mold station 72. A piston 132 or any other mechanical, electro-mechanical, or fluid driven device may be coupled to the movable mold part 22 to facilitate this shifting movement. Additionally, a guide pin 134 may be provided on the movable mold part 22 to help ensure that the stationary and movable mold parts 20, 22 are properly aligned before being clamped together. As shown in FIGS. 1-3, the stationary mold part 20 includes bores 136, 138 configured to receive the guide pin 134 when the movable mold part 22 is properly aligned. The bore 136 is positioned in a flange 140 on a side 142 of the stationary mold part 20, while the bore 138 extends into the stationary mold part 20 itself.

Figure 7:
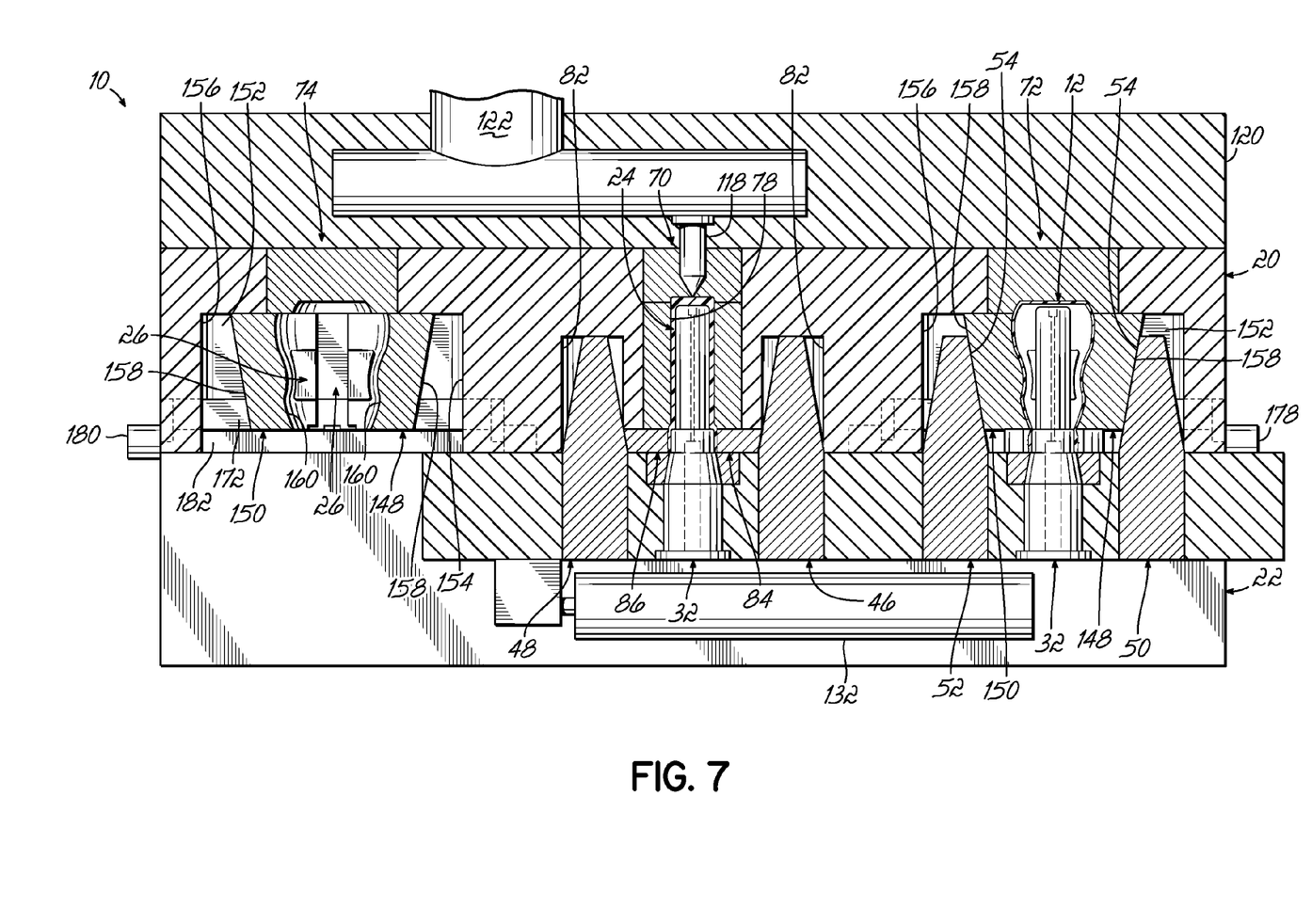
FIG. 7 is a view similar to FIG. 5, showing the injection blow mold system in a closed position and defining a blow mold cavity for blow molding the preform of FIG. 5 to form a container according to one embodiment of the present invention.

As shown in FIG. 6, the blow mold station 72 includes a first mold half 148 and a second mold half 150 positioned within a pocket 152 formed in the stationary mold part 20. The first and second mold halves 148, 150 are configured to move within the pocket 152 so that the blow mold station 72 is able to receive the wedge members 46, 48. More specifically, the first and second mold halves 148, 150 are spaced apart from opposed sides 154 and 156 of the pocket 152. Each mold half 148, 150 includes a tapered outer surface 158 and an inner surface 160 configured to define a portion of the blow mold cavity 26. When the movable mold part 22 is clamped against the stationary mold part 20, the tapered surfaces 154 of the wedge members 46, 48 cooperate with the tapered surfaces 158 to drive the first and second mold halves 148, 150 together. Eventually the first and second mold halves 148, 150 close the blow mold cavity 26 around the preform 124. Thus, the first and second mold halves 148, 150 are configured to move from their initial open positions shown in FIG. 6 to the closed positions shown in FIG. 7.

Figure 7A:
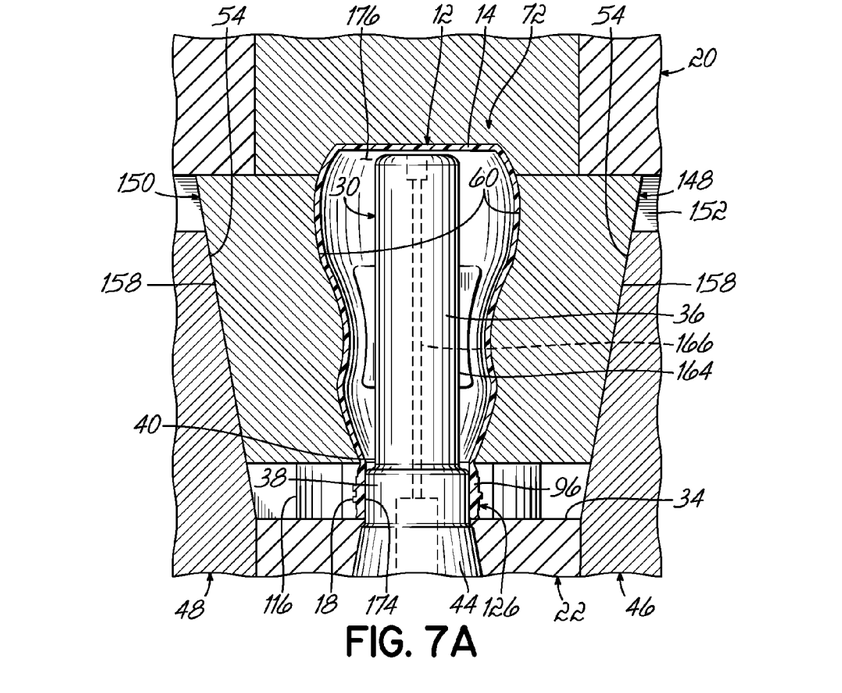
FIG. 7A is an enlarged view of the blow mold cavity shown in FIG. 7.

When the core pin 30 and preform 124 are received in the blow mold cavity 26, pressurized gas is blown through an exterior surface 164 of the core pin 30 through a gas passage 166. As best shown in FIG. 7A, the gas causes the preform 124 to expand and conform to the shape of the blow mold cavity 26 while the threaded neck 126 of the preform 124 retains its original shape. The blow molding operation therefore results in the formation of the receptacle 14 of the bottle 12. Although the blow mold cavity 26 (and thus the receptacle 14) is shown as having a somewhat pear-shaped configuration, those skilled in the art will appreciate that the first and second mold halves 148, 150 may be designed to produce a wide variety of other shapes without departing from the spirit and scope of the present invention.

During the blow molding process, the cap 16 is received and maintained in a corresponding cavity 170 (FIGS. 1 and 8A) of a pivot member or "flipper arm" 172 coupled to the blow mold station 72. When the movable mold part 22 is retracted from the stationary mold part 20, the blow mold cavity 26 retains the receptacle 14 while the adjacent cavity 170 retains the cap 16. Thus, the cap separates 16 from the core member 112 and is maintained adjacent to the receptacle 14 by the hinged strap 128. At approximately the same time, the core pin 30 is pulled through the neck 126 to expose an opening 174 (FIGS. 7A and 8A) into an internal cavity 176 of the receptacle 14. The receptacle 14 may be cooled as necessary during and after the retraction of the second mold piece 22.

Figure 8:
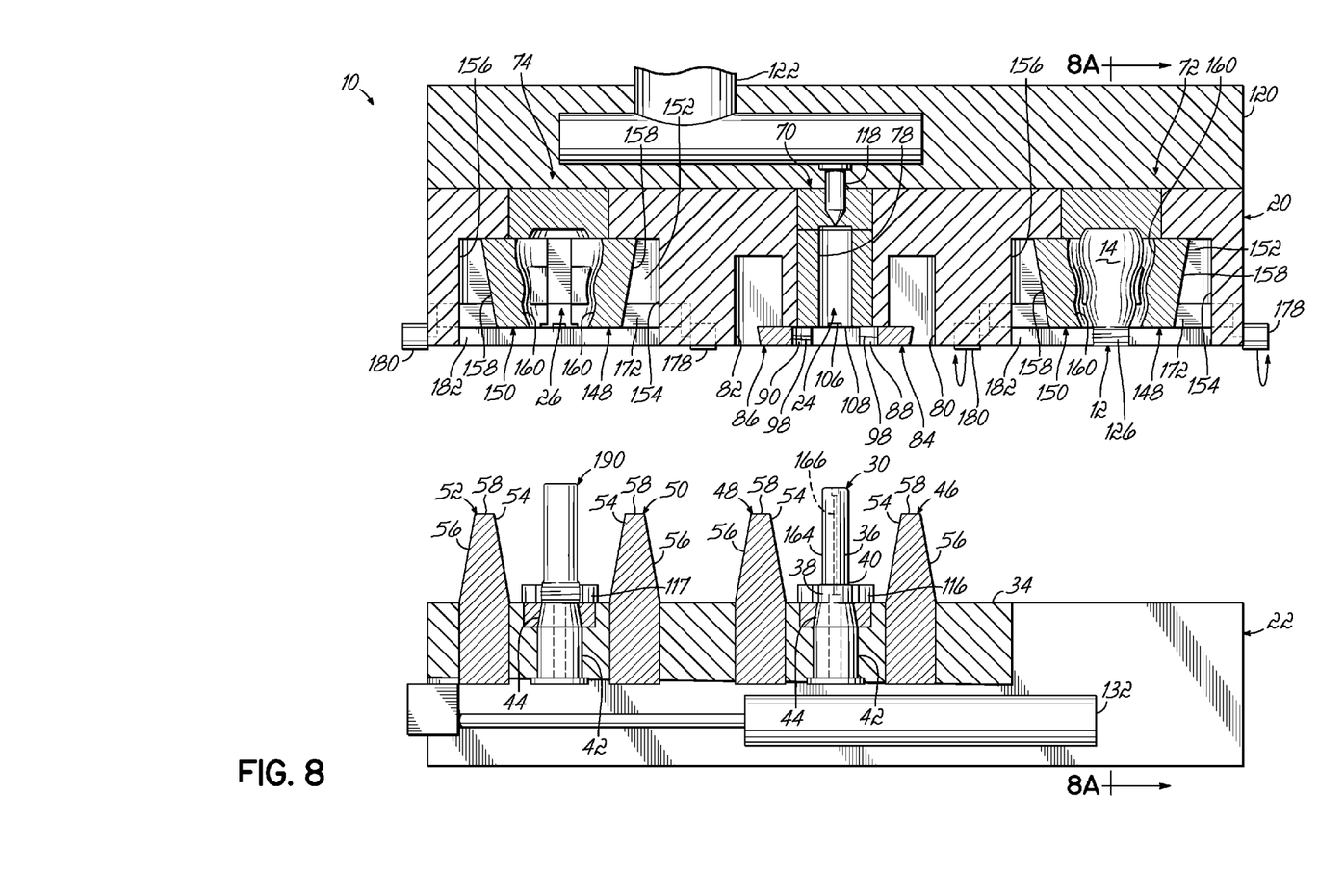
FIG. 8 is a view similar to FIG. 4, showing the injection mold system in an open position with the blow mold cavity retaining the blow molded container of FIG. 7 therein and the movable mold part shifted to the left side of the figure relative to the stationary mold part.
Figure 8A:
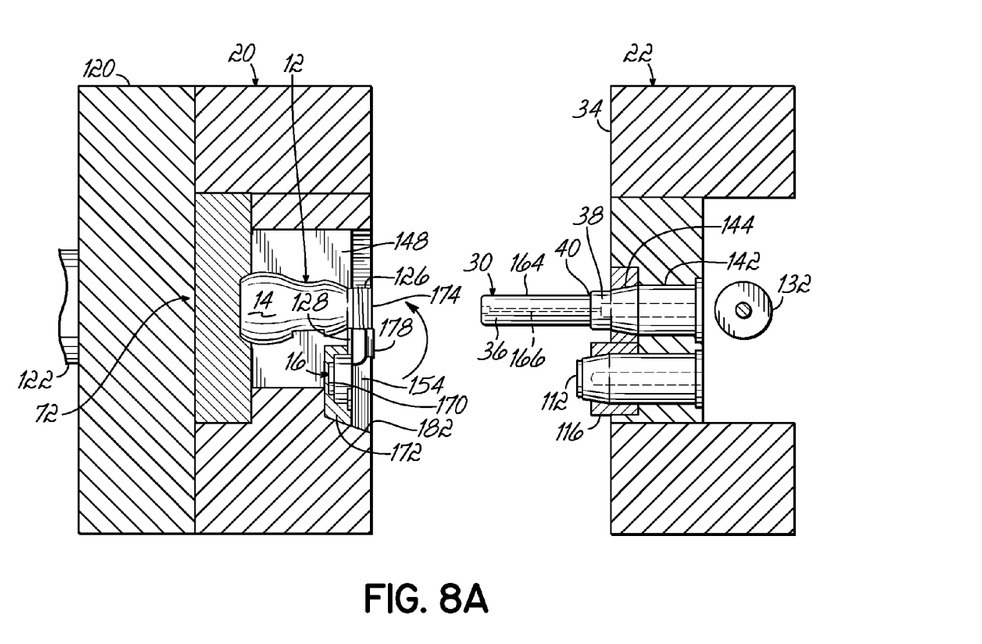
FIG. 8A is a cross-sectional view taken along line 8A-8A of FIG. 8, showing the blow molded container and the integral cap attached thereto.
Figure 8B:
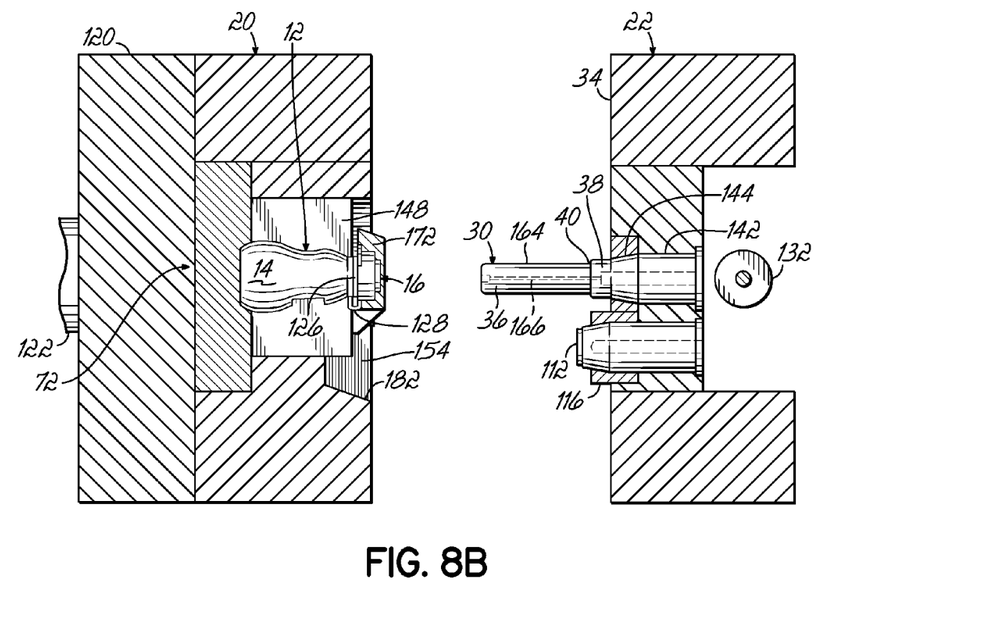
FIG. 8B is a view similar to FIG. 8A, showing the integral cap flipped to close the blow molded container.

FIGS. 8, 8A, and 8B show the pivot member 172 in further detail according to one embodiment. The pivot member 172 is coupled to the stationary mold part 20 by opposed pivot pins 178, 180 and is supported in one or more pockets 182 formed in the blow mold station 72. After the movable mold part 22 has been retracted from the stationary mold part 20, the pivot member 172 rotates about the pivot pins 178, 180 to "flip" the cap 16 over the opening 174 to close the bottle 12. The pivot member 172 is configured to rotate in a manner that allows the cap 16 to be received on the threaded neck 126 of the bottle 12. In one embodiment, the cap 16 is configured to form a generally fluid-tight seal with the bottle 12.

Figure 9:
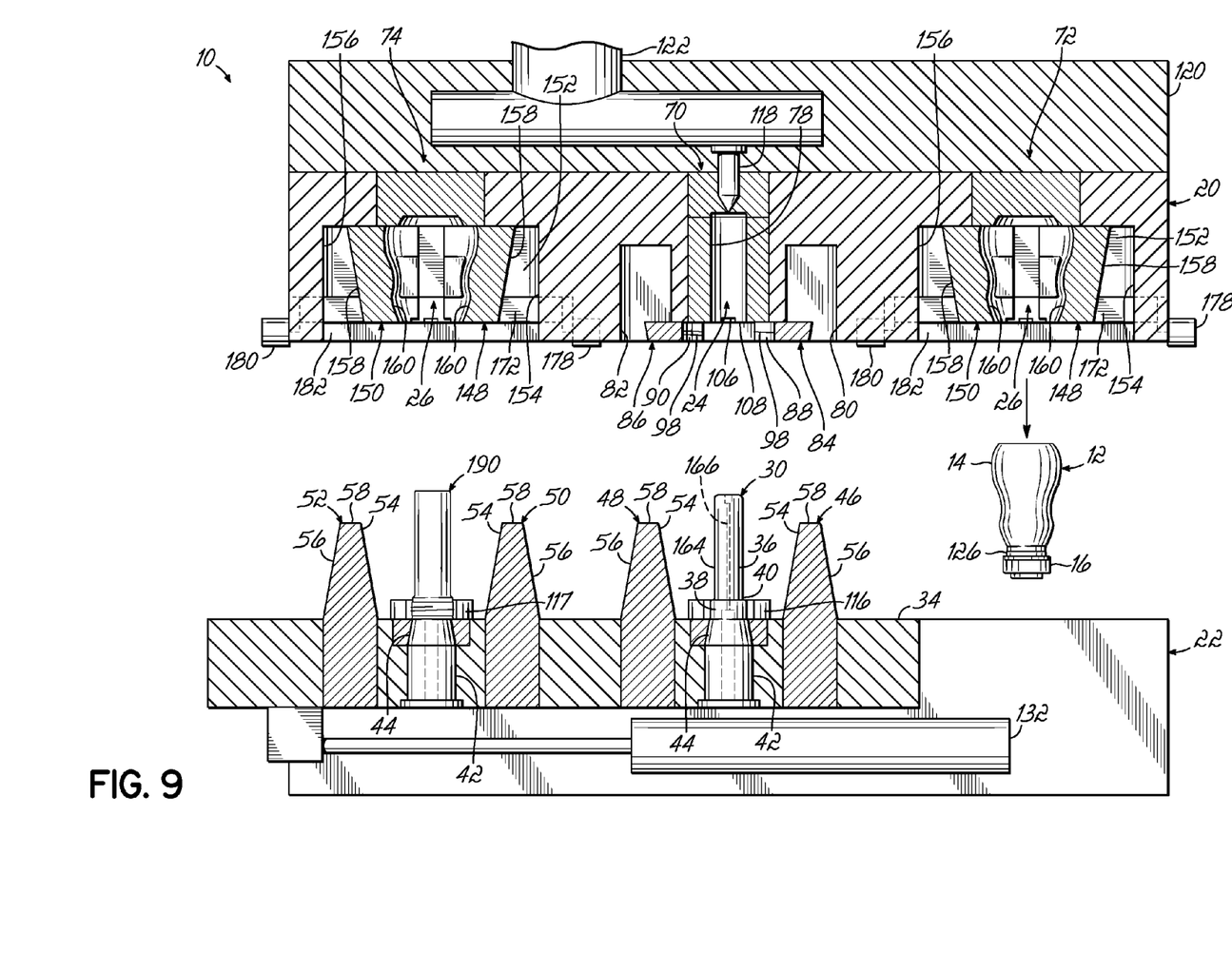
FIG. 9 is a view similar to FIG. 8, showing the closed container being ejected from the injection blow mold system.

The bottle 12 is ejected from the blow mold station 72 after the pivot member 172 rotates back into the pocket 182. More specifically, and with reference to FIG. 9, the first and second mold halves 148, 150 move back toward their initial open positions to open the blow mold cavity 26 and allow the bottle 12 to be ejected therefrom. After the core pin 30 is aligned with the injection mold cavity 70, the stationary and movable mold parts 20, 22 may then be clamped back together to begin a cycle for producing another bottle.

Although a single row of injection and blow molding stations are shown in the figures, it should be understood that multiple rows of such stations may be provided. Other arrangements could also be employed.

The injection blow mold system 10 may therefore be used to produce many bottles having integrally-formed caps attached thereto. Advantageously, the injection blow mold system 10 does not require additional machinery to complete the manufacturing process or to seal the bottles it produces. For example, injection-molded preforms do not need to be transferred from an injection-molding machine to a separate blow-mold machine to form the bottles. Additionally, the injection blow mold system 10 closes the bottles immediately after they are formed and without any human contact such that the bottles are "sterile-by-process." An additional machine to snap, screw, or otherwise attach caps to the bottles is not required. Thus, by incorporating both an injection molding station 70 and blow mold stations 72, 74 within the same mold, the injection blow mold system 10 reduces the number of machines that must be bought, operated, and maintained to produce bottles having an integral caps.

Because the containers 12 are produced using both an injection molding step and a blow molding step, the shape of their receptacles is not limited to that of a vial. As mentioned above, the first and second mold halves 148, 150 may be designed to define a blow mold cavity having a variety of different configurations. Thus, the injection blow mold system 10 may be used to produce containers of almost any desired shape or size for storing, collecting, and/or dispensing materials. The injection blow mold system 10 may also be configured to produce bottles that incorporate ergonomic and other convenient features. For example, in the embodiment shown in FIGS. 10A and 10B, the bottle 12 includes a pocket or depression 194 formed in the side wall of the receptacle 14. The pocket 194 is formed by providing a corresponding protrusion (not shown) on the inner surface 160 of one of the first and second mold halves 148, 150. In addition to providing a place for an individual to grip the bottle 12, the pocket 194 may be configured to retain the cap 16 in an open position. To this end, the cap 16 may include a protrusion 196 shaped to cooperate with the pocket 194. When an user wishes to secure the cap 16 in an open position, the user simply presses the cap 16 against the pocket 194 until the protrusion 196 is received therein. An interference fit may be created between the components such that the cap 16 snaps into place and is retained by the pocket 194. One skilled in the art will appreciate that other structural formations provided on the bottle 12 and cap 16 are possible as well for retaining the cap 16 in an open position.

As described above, the containers 12 may include one or more threads 18 provided on the neck 126 of the container 12. In this embodiment, the container 12 may be used for collecting and storing breast milk obtained using a breast pump, for example, similar to the container fully described in U.S. Ser. No. 11/191,301, filed Jul. 27, 2005 and entitled Container for Collecting and Storing Breast Milk, owned by the common assignee and the disclosure of which is hereby incorporated herein by reference in its entirety. The thread(s) 18 may be configured to provide screw-on connection between the container 12 and a breast pump (not shown) during collection of breast milk within the container 12. The thread(s) 18 may further be configured to provide a screw-on connection (when not connected to a breast pump) between the container 12 and a feeding nipple (not shown).

In one embodiment, the thread 18 comprises a single helical thread. Alternatively, the thread 18 may comprise a plurality of helical or non-helical threads formed on the neck of the container 12.

In the closed and sealed position of the cap 16, a skirt 198 of the cap 16 may be positioned above the thread(s) 18. Alternatively, the skirt 198 may be configured to cover a portion or all of the thread(s) 18 when the cap 16 is closed on the container 12. The container 12 may include calibration markings or other indicia to indicate the amount of breast milk contained therein. At least one of the container 12 or cap 16 may include an area thereon configured to receive writing such as, for example, the mother's name, baby's name, collection date/time, any illnesses, any use of medication and/or hospital identification.

In one aspect of the invention, the injection blow mold system 10 provides an overlapping cycle for forming a second container. For example, referring again to FIGS. 6 and 7, when the core pin 30 is received in the blow mold station 72, the core pin 32 is received in the injection mold station 70. The core pin 32 and wedge members 50, 52 interact with the stationary mold part 20 in substantially the same manner as the core pin 30 and wedge members 46, 48. Thus, as the preform 124 is being blow molded in the blow mold station 72, thermoplastic material may be supplied to the injection mold cavity 24 to begin forming a second preform 190 on the core pin 32. The second preform 190 is received in the blow mold cavity 26 of the blow mold station 74 while the core pin 30 is received in the injection mold station 70 to begin forming another container. The second preform is blow molded at the blow mold station 74 while another preform is injection molded onto the core pin 30 at the injection mold station 70.

Thus, by simultaneously completing manufacturing operations on different containers, the injection blow mold system 10 enables overall production times to be reduced. The overlapping cycle for forming the second container therefore results in greater output and overall efficiency.

While the invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

Having described the invention, we claim:

1. An apparatus for forming a container having a receptacle and an integral cap in a single mold, comprising:
    a first mold part in the single mold having an injection mold portion and a first blow mold portion; and
    a second mold part in the single mold having a first core pin and a second core pin configured to cooperate with the injection mold portion in a first position to define an injection mold cavity for forming a preform and the integral cap joined to the preform, the first core pin further being configured to cooperate with the first blow mold portion in a second position to define a blow mold cavity for forming the receptacle of the container from the preform, wherein the second mold part is moved by shifting between the first position and second position with the preform being supported by, and without separating from, the first core pin and the cap being supported by, and without separating from, the second core pin.

2. The apparatus of claim 1, the first mold part further including an injection passage configured to supply molten material to the injection mold cavity to form the preform and integral cap.

3. The apparatus of claim 1, the second mold part further including a gas passage configured to supply pressurized gas to an exterior surface of the first core pin when the second mold part is in the second position so that the preform expands to the shape of the blow mold cavity.

4. The apparatus of claim 1, further comprising:
    two or more threaded members coupled to the first mold part and configured to define a neck forming portion of the injection mold cavity, the threaded members each having a threaded surface configured to face the first core pin.

5. The apparatus of claim 4, the second mold part further comprising a first wedge member positioned proximate the first core pin and a second wedge member positioned proximate the first core pin and opposite the first wedge member, the first mold part further comprising a central cavity configured to accommodate the first core pin, a first side cavity configured to accommodate the first wedge member, and a second side cavity configured to accommodate the second wedge member, the first and second wedge members configured to contact the at least two threaded members when the first core pin cooperates with the first mold part to define the injection mold cavity.

6. The apparatus of claim 1, wherein the first blow mold cavity is defined by a first mold half and a second mold half in the single mold with each configured to move from an initial open position to a closed position proximate the first core pin when the first core pin is inserted into the first blow mold portion.

7. The apparatus of claim 1, the first mold part further including a second blow mold portion positioned opposite the first blow mold portion and equally spaced apart from the injection mold portion, the second mold part further including a third core pin spaced apart from the first core pin by a distance corresponding to the distance between the injection mold portion and the second blow mold portion on the first mold part, the third core pin being configured to cooperate with the injection mold portion in the second position to define the injection mold cavity for forming a second container in an overlapping cycle.

8. The apparatus of claim 1, further comprising:
    a pivot member coupled to the blow mold portion of the first mold part and configured to close the cap over the receptacle to seal the container.

\* \* \* \* \*